US006486797B1

(12) United States Patent
Laidman (10) Patent No.: US 6,486,797 B1
(45) Date of Patent: Nov. 26, 2002

(54) TURBO FLARE HAZARD MAKER (75) Inventor: Jerry Laidman, Henderson, NV (US)

(73) Assignee: Lighting and Electronic Design, Henderson, NV (US)

( * ) Notice: Subject to any disclaimer, the term of this patent is extended or adjusted under 35 U.S.C. 154(b) by 0 days.

(21) Appl. No.: 09/756,614

(22) Filed: Jan. 5, 2001

(51) Int. Cl.[7] .................................................. B60Q 7/00

(52) U.S. Cl. ................. 340/908.1; 340/332; 340/693.5; 340/815.45; 362/800

(58) Field of Search .............................. 340/908, 908.1, 340/693.5, 332, 815.45; 362/800

(56) References Cited

U.S. PATENT DOCUMENTS

| 5,252,893 | A | * | 10/1993 | Chacham et al. | ........ 340/908.1 |
| 5,412,381 | A | * | 5/1995 | Dicks | ....................... 340/908.1 |
| 5,561,346 | A | * | 10/1996 | Byrne | ......................... 362/800 |
| 5,594,433 | A | * | 1/1997 | Terlep | ...................... 340/908.1 |
| 6,183,100 | B1 | * | 2/2001 | Suckow et al. | ............. 340/471 |

* cited by examiner

Primary Examiner—Daniel J. Wu
(74) Attorney, Agent, or Firm—Leonard Weiss (57) ABSTRACT A highway hazard marker is housed within a disc shaped high impact plastic housing, an upper portion of which is transparent. A plurality of LEDs are circularly disposed proximal to the side of the upper portion. A ring counter provides signals to transistors that sequentially drive the LEDs. Excitation provided to the ring counter is controlled to cause a desired current through the LEDs.

14 Claims, 7 Drawing Sheets

TURBO FLARE HAZARD MAKER

BACKGROUND OF THE INVENTION

1. Field of Invention

This invention is in the general field of highway warning devices and, more particularly, is a hazard marker that provides an aimed illumination.

2. Description of the Prior Art

A hazard marker is typically placed near a problem area created by a mishap that occurs on either a street or a highway. Reasons for placing the marker include protection of people against injury, discouraging people from either walking or driving in the problem area, discouraging intrusion into emergency medical treatment of injuries resulting from the mishap and discouraging intrusion into clean up activity. The hazard marker may, for example, be a flare, a sequentially illuminated arrow, a message sign, a wooden barricade that carries a blinking warning light or an orange cone.

The flare has an advantage of being easily visible at night. However, a motorist who drives past one or more flares may be temporarily blinded by their brightness, thereby endangering the motorist and people in the vicinity of the motorist. The flare is particularly dangerous to use where an automobile collision causes a spillage of gasoline on a roadway. Among other undesirable aspects of the flare is that a person charged with igniting the flare risks being burned and having their clothing burned. The flare additionally releases noxious fumes when it burns.

The orange cone is one of the most commonly used hazard markers. The cone frequently has a light and a battery mounted near its apex. The light cannot readily be seen outside of an immediate area where the cone is placed, particularly in poor weather conditions. The light and the battery make the cone top heavy, thereby destabilizing the cone. Even in the absence of the destabilizing, the cone is frequently destroyed or badly damaged when inadvertently struck by a motor vehicle.

Practically all hazard markers are either badly damaged or destroyed when struck by the motor vehicle; additionally, the motor vehicle is frequently damaged. Thus there is a need for a new type of hazard marker that is neither damaged nor causes damage when struck by the automobile, provides light that can be seen outside of an immediate area where the new type of marker is placed and does not temporarily blind a passing motorist with its brightness.

SUMMARY OF THE INVENTION

According to one aspect of the present invention, a turbo flare hazard marker in the general shape of a disc includes a transparent upper housing and a lower housing that are made from a high impact plastic. Each of three or more similar legs of the marker are made from a plastic plate that is connected to an outer edge of the lower housing and extends radially therefrom. A foot of each of the legs extends below a bottom surface of the lower housing.

According to a second aspect of the present invention, the turbo flare hazard marker includes a plurality of light emitting diodes (LEDs) that have a circular disposition within the housing. The LEDs are oriented either to provide light that can be seen by a motorist at a substantial distance from the turbo hazard flare marker or provide light that can be seen by an aircraft flying above the turbo hazard marker.

According to a third aspect of the invention, an oscillator drives an input of a ring counter. Outputs of the ring counter sequentially drive the LEDs. Current through the LEDs passes through a sampling resistor, thereby providing a sampling voltage. A reference voltage is compared to the sampling voltage. An excitation voltage applied to the ring counter is changed in response to a difference between the reference voltage and the sampling voltage. The change in the excitation causes a corresponding change in the drive at the output of the ring counter that results in the reference and sampling voltages being substantially equal.

The turbo flare hazard marker is of a construction that is neither damaged by a motor vehicle nor causes damage to the motor vehicle, provides light that can be seen outside of its immediate area and does not blind a passing motorist with its brightness.

Other objects, features, and advantages of the invention should be apparent from the following description of the preferred embodiment thereof as illustrated in the accompanying drawing.

DESCRIPTION OF THE PREFERRED EMBODIMENT

Figure 1:
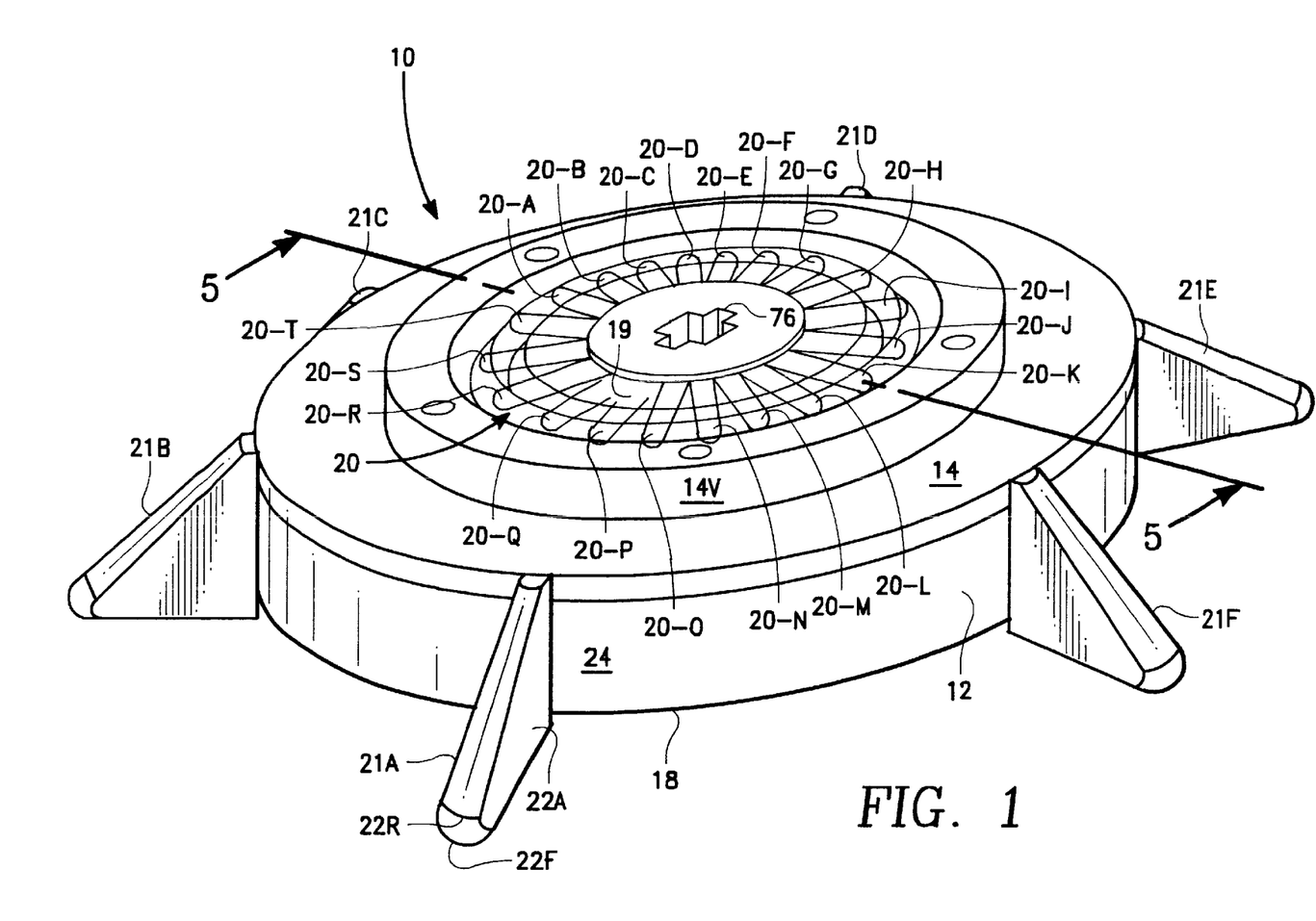
FIG. 1 is a perspective view of the preferred embodiment of the present invention.
Figure 2:
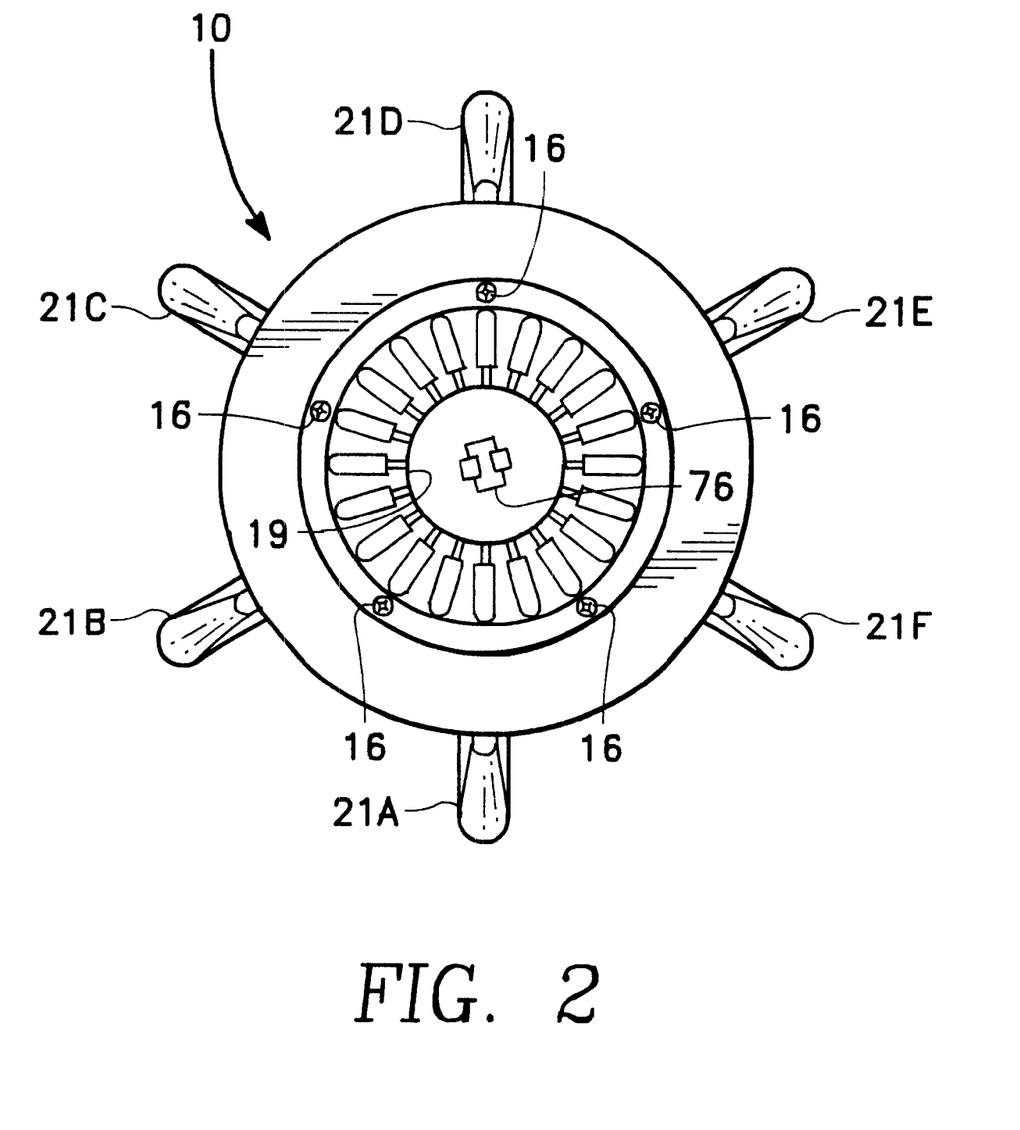
FIG. 2 is a plan view of the embodiment of FIG. 1.

As shown in FIGS. 1 and 2, a turbo hazard marker 10 has a general shape of a disc. The marker 10 includes a lower housing 12 and an upper housing 14 that are made from a high impact plastic. The upper housing 14 is transparent. A plurality of bolts 16 pass through the upper housing 14 and a bottom 18 of the lower housing 12 where they screw into nuts (not shown), whereby the lower housing 12 and the upper housing 14 are held together.

Visible through the upper housing 14 is a printed circuit board 19 whereon LEDs 20-A through 20-T are circularly disposed proximal to a wall 14V of the housing 14. As explained hereinafter, the LEDs 20-A through 20-T transmit light through the wall 14V.

The hazard marker 10 includes a leg 21A that has general shape of a right triangular slab. A side 22A (FIG. 1) of the leg 21A is connected to a side 24 of the lower housing 12. The leg 21A extends radially from the hazard marker 10. Because of its size, the leg 21A extends to a level below the bottom 18 whereby a ramp edge 22R of the leg 21A extends from below a level of the bottom 18 to the upper housing 14.

The leg 21A includes a foot 22F that extends from an end of the ramp edge 22R to the side 22A. The foot 22F has a V shaped cross section.

Legs 21B–21F, similar to the leg 20A, are connected to the side 24. The legs 21A–21F have equal spacing therebetween.

Because of the legs 21A–21F, the bottom 18 does not usually rest upon the ground. Therefore, when a motor vehicle drives over the hazard marker 10 on an asphalt roadway, the V shaped feet sink into the asphalt thereby preventing the hazard marker 10 from being moved laterally. Additionally, when the motor vehicle drives over the hazard marker 10, the ramp edges of the legs 20A–20F prevent damage to the motor vehicle and to the hazard marker 10.

Figure 3:
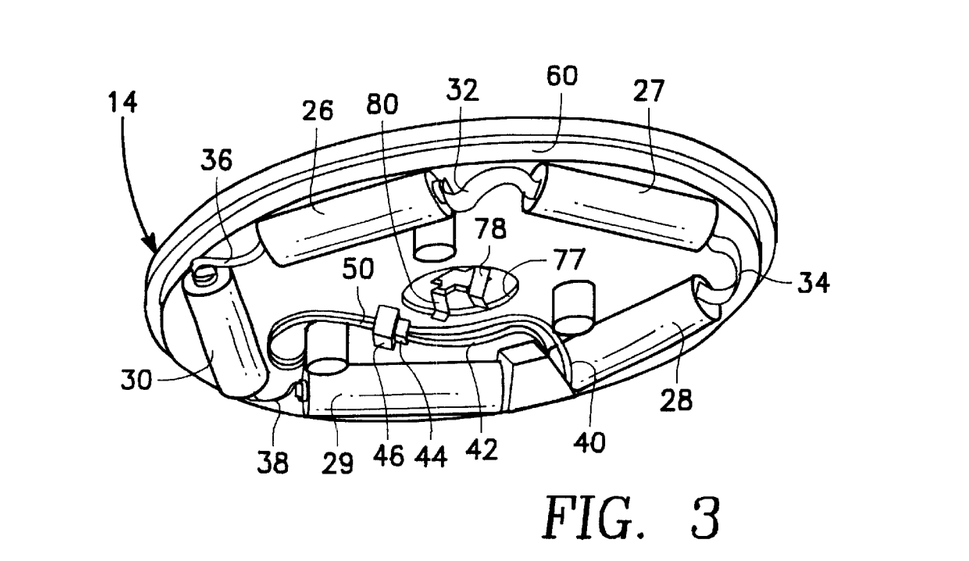
FIG. 3 is a perspective view of a circuit board in the embodiment of FIG. 1.
Figure 4:
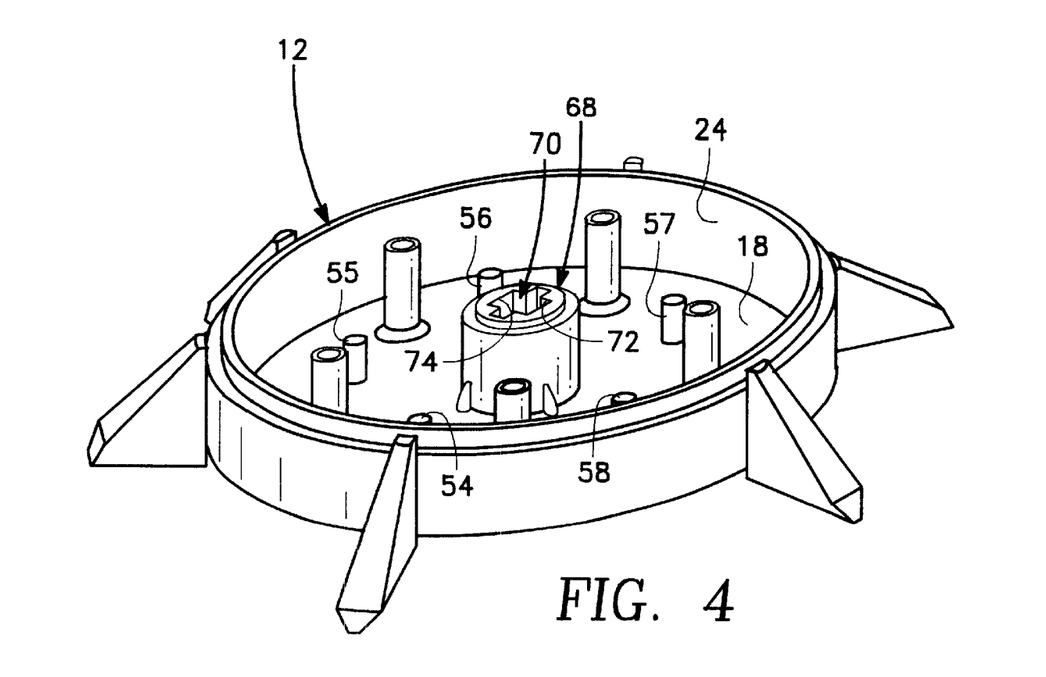
FIG. 4 is a perspective view of the interior of a housing in the embodiment of FIG. 1.

As shown in FIGS. 3 and 4, rechargeable nicad batteries 26–30 are connected in series. More particularly, the battery 26 is connected to the battery 27 through a conductive ribbon 32 and the battery 27 is connected to the battery 28 through a conductive ribbon 34. Similarly, the battery 26 is connected to the battery 30 through a conductive ribbon 36 and the battery 30 is connected to the battery 29 through a conductive ribbon 38. In an alternative embodiment, non-rechargeable batteries are used.

An anode (not shown) of the battery 28 and a cathode (not shown) of the battery 29 are connected through wires 40, 42, respectively, to a plug 44 which mates with a socket 46. A pair of wires 50 connects the socket 46 to the circuit board 19, whereby the batteries 26–30 provide a voltage to the circuit board 19. The plug 44 and the socket 46 render unnecessary a making and breaking solder connections when the batteries 26–30 are removed and reinstalled for any purpose.

The lower housing 12 includes similar posts 54–58 (FIG. 4) that extend perpendicularly from the bottom 18. When the lower housing 12 and the upper housing 14 are connected together, the posts 54–58 wedge the batteries 26–30, respectively, against the side 24. Because the hazard marker 10 has the shape of the disc, a curvature of the side 24 and the posts 54–58 maintain positions of the batteries 26–30 within the lower housing 12.

It should be understood that the batteries 26–30 rest upon the bottom 18. Additionally, a sponge rubber annulus 60 is placed over the batteries 26–30. The circuit board 19 is placed upon the sponge annulus 60. Because of a thickness of the annulus 60, the circuit board 19 is within the upper housing 14.

Figure 5:
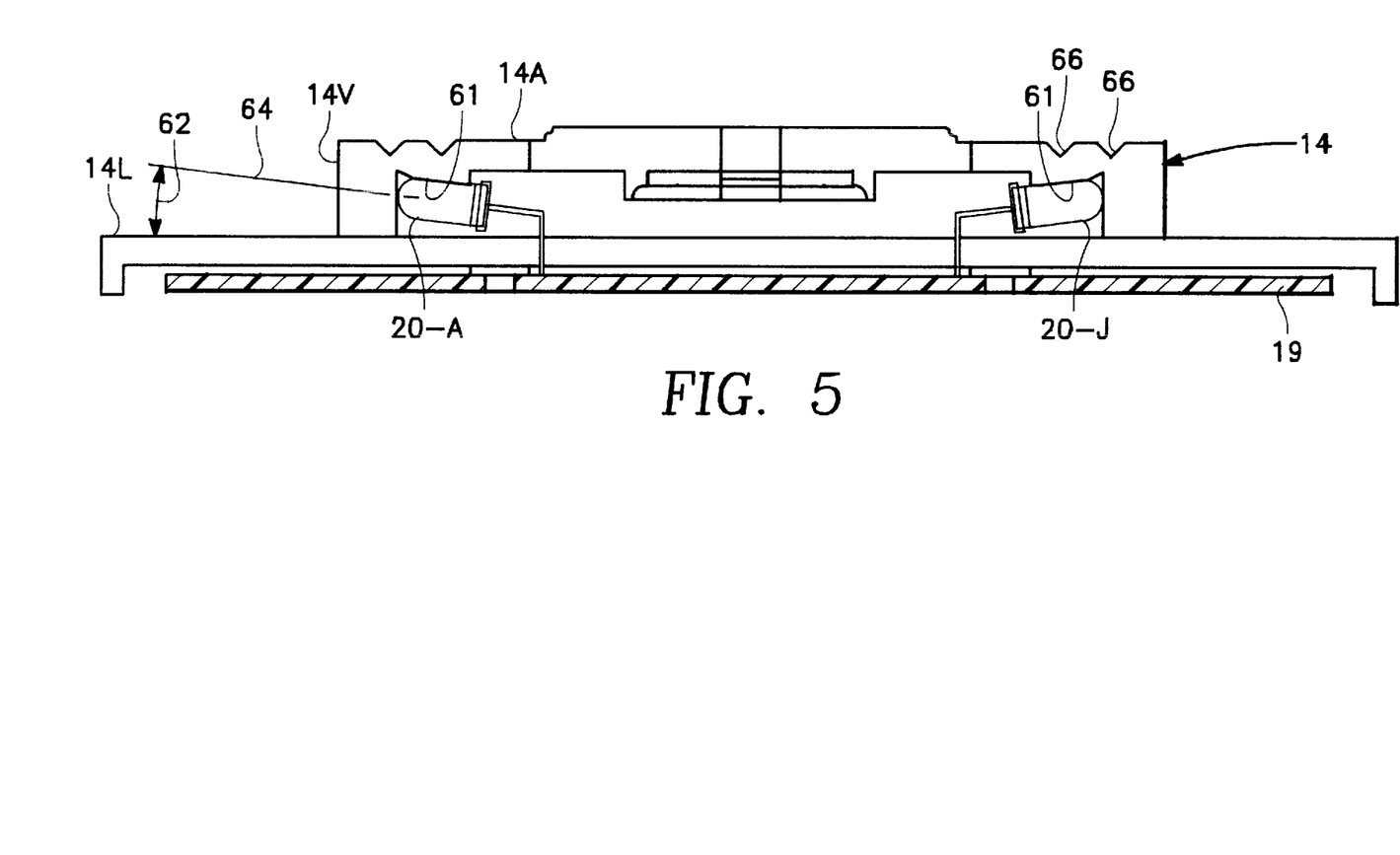
FIG. 5 is a section view of a lid of a housing in FIG. 1 taken along the line 5—5.

As shown in FIG. 5, LEDs 20-A, 20-J have spring-like leads that are connected to the circuit board 19. An interior surface 60 of the upper housing 14 urges the LED 20-A into a position that causes an angle 62 to be sustained between a central axis 64 of the LED 20-A and a surface 14L of the lower housing 14. It has been determined that when the angle 62 is substantially equal to four degrees, light transmitted through the wall 14V is visible at distances in excess of fifty yards. The LED 20-J is positioned in a similar manner. In this embodiment, the positioning of the LEDs 20-A, 20-J is exemplary of the positioning of the LEDs 20-B through 20-I and LEDs 20-K through 20-T.

The upper housing 14 has annular depressions 66 therein that diffuses light from the LEDs 20-A through 20-T that passes therethrough. The diffused light does not cause a glare that temporarily blinds a passing motorist.

In an alternative embodiment, the LEDs 20-A through 20-T are positioned to transmit light vertically through a horizontal wall 14A of the upper housing 14. The vertically transmitted light is used to indicate a scene of a mishap to an aircraft.

At the center of the interior of the housing 12 (FIG. 4) is a post 68 with an axial hole 70 therethrough. The hole 70 includes slots 72, 74 that extend through the column 68. A storage hole 76 (FIGS. 1 and 2) similar to and coaxial with the hole 70 extends through the upper housing 14.

The circuit board 19 (FIG. 3) has a central hole 77 therethrough. Spring contacts 78, 80 are connected to the circuit board 19 near the hole 77. When the housings 12, 14 are connected, the contacts 78, 80 are fitted into the slots 72, 74, respectively. The contacts 78, 80 are connected to the batteries 26–30 via a bridge rectifier (not shown) on the circuit board 19. Because of the bridge rectifier, polarity of a voltage applied to the contacts 78, 80 is irrelevant.

Figure 6:
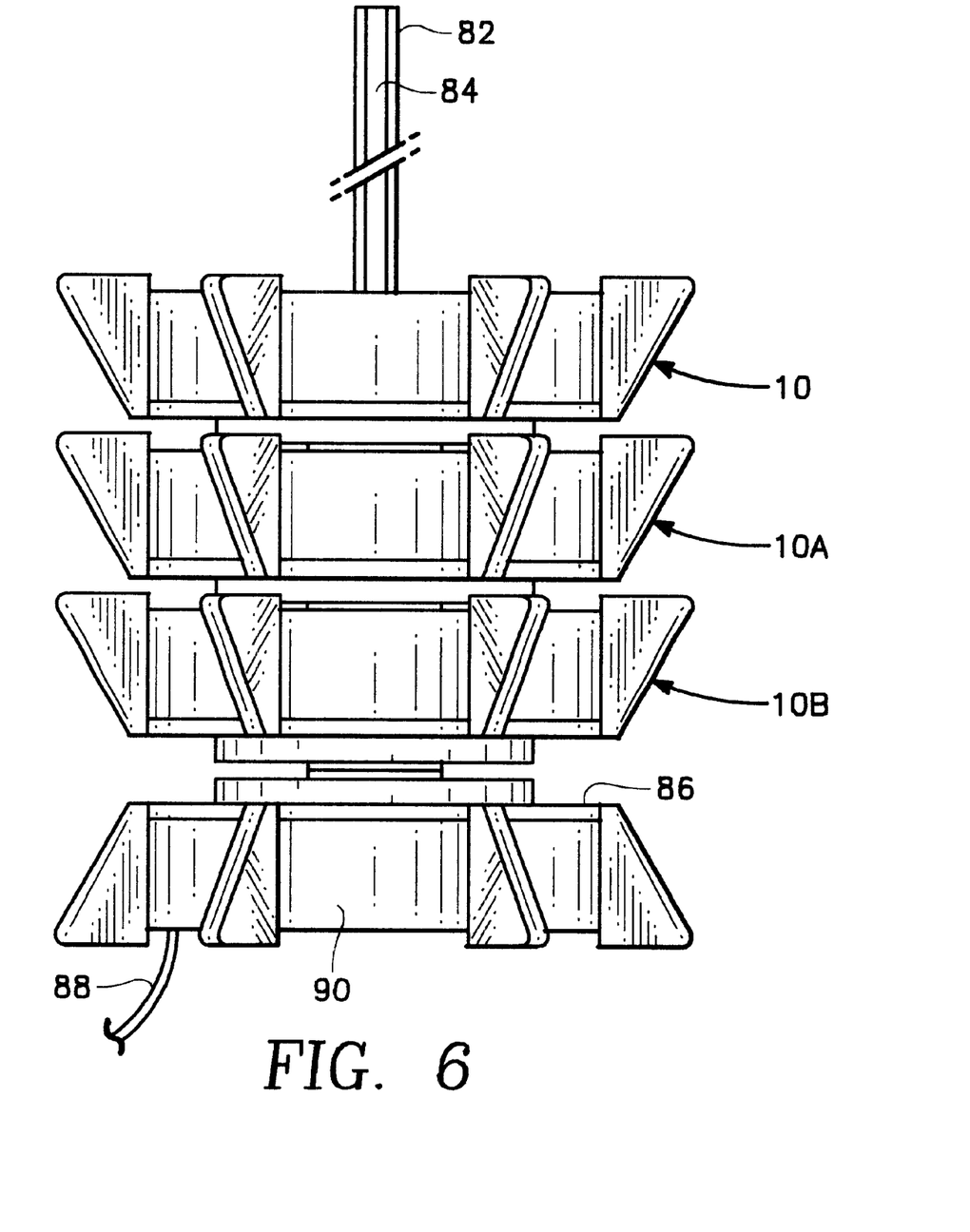
FIG. 6 is a side elevation of hazard markers mounted upon a charging stick.

As shown in FIG. 6, a storage stand is for storing the hazard marker 10 and hazard markers 10A, 10B that are similar to the hazard marker 10. The storage stand includes a fiber glass charging stick 82 that has a rectangular cross section. Metal strips 84 extend along opposite sides of the stick 82. An end (not shown) of the stick 82 is connected to a base 86 that has an outward appearance similar to that of the hazard marker 10. It should be understood that the appearance of the base 86 is of no critical importance.

As explained hereinafter, when the hazard marker 10 is positioned upside down (with the upper housing 14 below the lower housing 12), the batteries 26–30 do not provide power. Accordingly, the hazard marker 10 is stored upside down with the stick 82 passing through the holes 70, 76, 77. The hazard markers 10A, 10B are similarly stored. Within the hole 70, the contacts 78, 80 (FIG. 3) provide a connection to the metal strips 84, thereby providing an electrical connection of the metal strips 84 to the batteries 26–30 via the bridge rectifier. A similar electrical connection is made to the hazard markers 10A, 10B.

A pair of wires 88 passes through an outer wall 90 of the base 86 to connect to the metal strips 84. Because of the electrical connection of the metal strips 84 to the batteries 26–30, application of a charging voltage to the wires 88 charges the batteries 26–30. Batteries of the hazard markers 10A, 10B are similarly charged.

Figure 7:
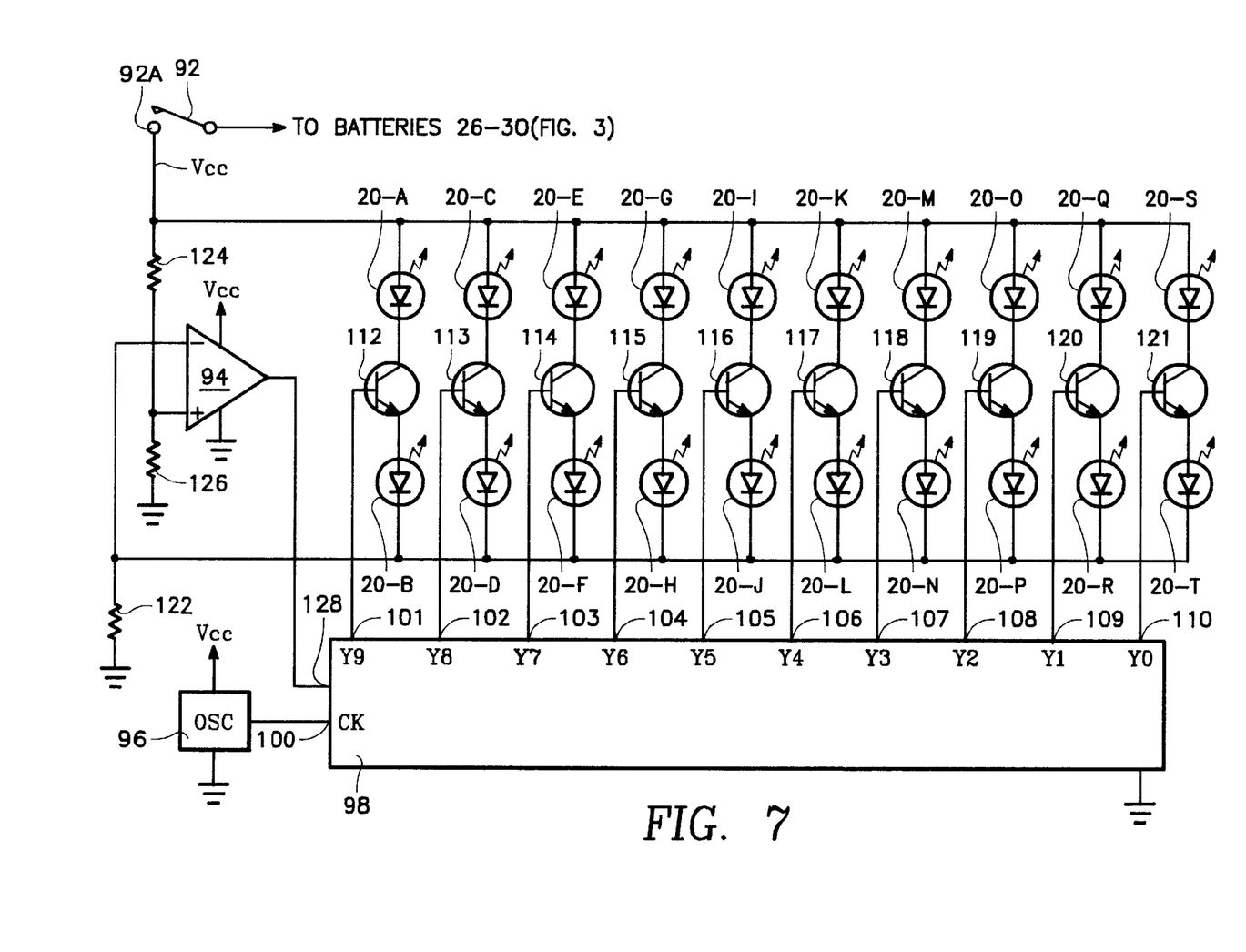
FIG. 7 is a schematic showing of elements that cause a sequential illumination of LEDS in the embodiment of FIG. 1.

As shown in FIG. 7, there is a connection (not shown) between the batteries 26–30 and a mercury switch 92. When the hazard marker 10 is right side up, the switch 92 closes, thereby providing a voltage, designated as Vcc, to a contact 92A of the switch 92. The contact 92A is connected to an operational amplifier 94 and an oscillator 96, whereby the voltage, Vcc, is provided to the operational amplifier 94 and the oscillator 96.

Figure 8:
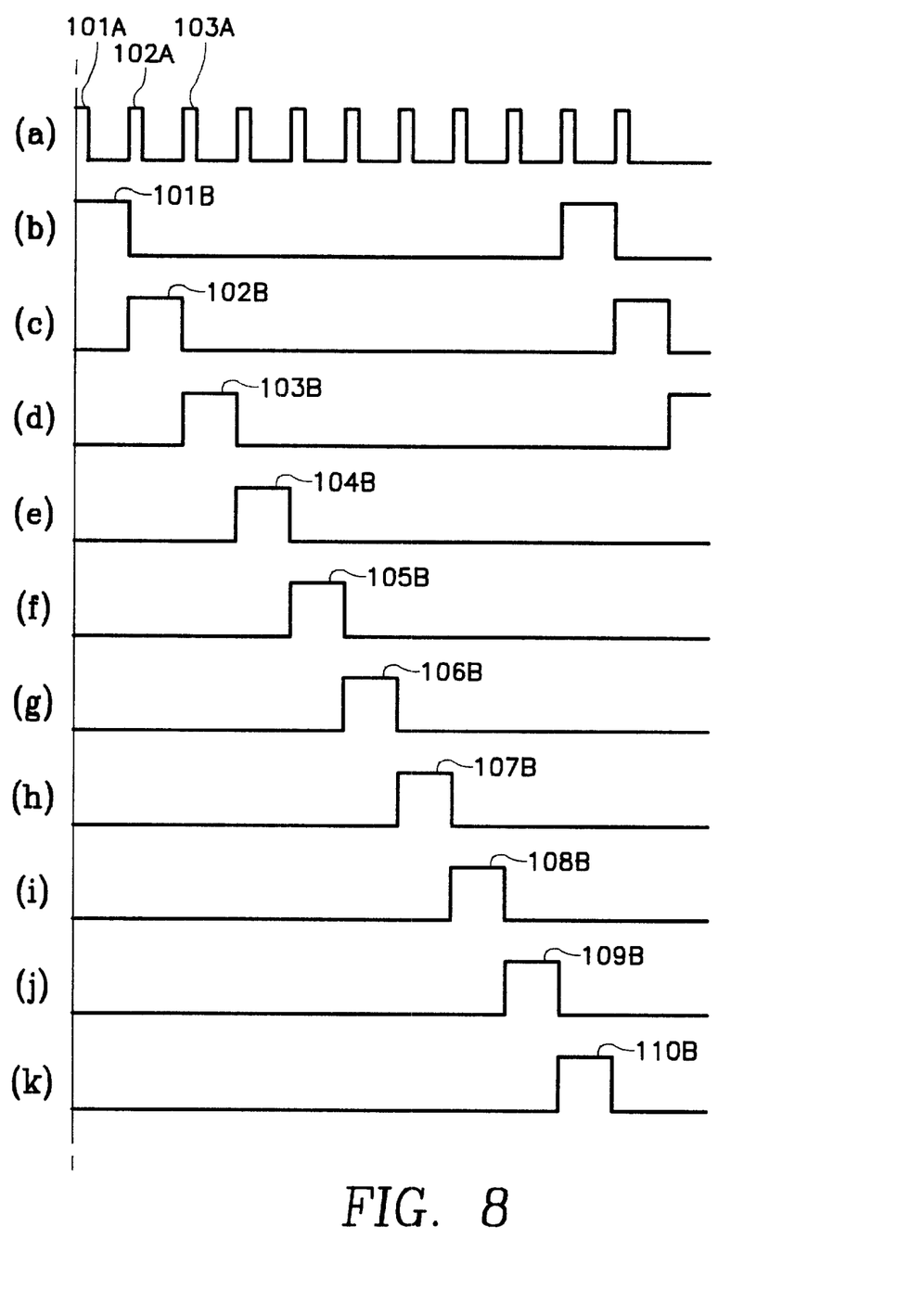
FIG. 8 is a timing diagram applicable to the schematic of FIG. 7.

The oscillator 96 provides a train of pulses with an 18 millisecond period that are represented in FIG. 8(a). The oscillator 96 is connected to a ring counter 98 at a clock input 100.

A first pulse 101A and a second pulse 102A of the train of pulses (FIG. 8(a)) cause an output 101 of the ring counter 98 to provide an 18 millisecond pulse 101B (FIG. 8(b)). The second pulse 102A and a third pulse 103A (FIG. 8(a)) cause an output 102 of the ring counter 98 to provide an 18 millisecond pulse 102B, FIG. 8(c). It should be understood that the pulse 101B ends simultaneously with a beginning of the pulse 102B. In a similar manner, 18 millisecond pulses are provided at outputs 103–110, respectively, of the ring counter 98. The pulses at the outputs 103–110 are represented in FIG. 8(d)–FIG. 8(f) as pulses 103B–110B, respectively.

From the explanation given hereinbefore the pulses 101B–110B are provided in a serial manner, one at a time. It should be understood that the amplitude of the pulses 101B–110B is directly related to a voltage applied to an excitation input of the ring counter 98. The application of the voltage to the excitation input is described hereinafter.

The outputs 101–110 are connected to bases of NPN transistors 112–121, respectively. The transistors 112–121 have their collectors respectively connected to LEDs 20-A, 20-C, 20-E, 20-G, 20-I, 20-K, 20-M, 20-O, 20-Q and 20-S at their cathodes, anodes thereof being all connected to the contact 92A. The transistors 112–121 have their emitters respectively connected to the LEDs 20-B, 20-D, 20-F, 20-H, 20-J, 20-L, 20-N, 20-P, 20-R, 20-T at their anodes, cathodes thereof being all connected through a sampling resistor 122 to ground and to the operational amplifier 94 at an inverting input thereof, whereby a sampled voltage is provided to the amplifier 94.

When the switch 92 is closed, substantially equal currents flow through the LEDs 20-A, 20B in response to the pulse 101B(FIG. 8) being provided to the transistor 112, thereby causing an emission of light from the LEDs 20A, 20B. In a similar manner, current flows through the LEDs 20-C, 20-D, the LEDs 20-E, 20-F, the LEDs 20-G, 20-H, the LEDs 20-I, 20-J, the LEDs 20-K, 20-L, the LEDs 20-M, 20-N, the LEDs 20-O, 20-P, the LEDs 20-Q, 20-R and the LEDs 20-S, 20-T in response to the pulses 102B–110B, respectively, to cause emissions of light therefrom.

The contact 92A is connected through a resistor 124 to a non-inverting input of the amplifier 94. A resistor 126 is connected from the non-inverting input to ground. In other words, the resistors 124, 126 are a voltage divider that provides a reference voltage to the non-inverting input. An output of the amplifier 94 is connected to an excitation input 128 of the ring counter 98 whereby an excitation input voltage is provided to the ring counter 98.

When, for example, the pulse 101 B is provided, an emitter current of the transistor 112 passes through the resistor 122, thereby providing the sampled voltage. In response to the sampled voltage being greater than the reference voltage, the excitation input voltage is reduced, thereby reducing the amplitude of the pulse 101B (FIG. 8) to cause a reduction of the emitter current of the transistor 112. Correspondingly, in response to the sampled voltage being less than the reference voltage, the excitation input voltage is increased, thereby increasing the amplitude of the pulse 101B, to cause an increase of the transistor 112 emitter current, whereby the amplitude of the pulse 101B is regulated. In a similar manner, the amplitudes of the pulses 102B–110B are regulated.

In an alternative embodiment, the diodes 20-A, 20-C, 20-E, 20-G, 20-I, 20-K, 20-M, 20-O, 20-Q, and 20-S are omitted and the collectors of transistors 112–121 are connected to the contact 92A.

Thus there is described herein a turbo flare hazard marker that is especially suited for marking a problem area created by a mishap on a highway.

I claim:

1. A turbo flare hazard marker, comprising:
   a disc shaped housing with a transparent upper portion;
   three or more similar legs integrally connected to an exterior surface of said housing, said legs each having a foot that extends to a level below a level of a bottom surface of said housing;
   a plurality of light sources circularly disposed within said upper portion proximal to a wall thereof; and
   means for causing a successive emission of light from said light sources.

2. The hazard marker of claim 1 wherein said housing and said legs are made from a high impact plastic, said legs each having the shape of a right triangular slab that extends radially from said housing to form a ramp that extends from a level below said housing to an upper portion of said housing, said foot having a V shaped cross section that extends from a lower end of said ramp to a side of said housing.

3. The hazard marker of claim 1 wherein each of said plurality of light sources is an LED.

4. The hazard marker of claim 3 additionally comprising a printed circuit board whereon said LEDs are connected, a top of said upper portion having a surface that abuts said LEDs to urge said LEDs into a position that causes most of said emitted light to be transmitted through a side of said upper portion.

5. The hazard marker of claim 4 wherein an angle between said transmitted light and a surface of said upper housing causes said transmitted light to be visible at a distance of at least one hundred yards from said hazard marker.

6. The hazard marker of claim 4 wherein said angle substantially equals four degrees.

7. The hazard marker of claim 4 wherein said top of said upper portion has annular depressions in a top surface thereof that diffuses light passing therethrough.

8. The hazard marker of claim 1 wherein said means includes a rechargeable battery.

9. The hazard marker of claim 8 wherein said housing has aligned storage holes through its top and bottom, additionally comprising:
   a plastic cylindrical post within said housing connected to a bottom thereof, said post and said housing being concentric, said post having a central longitudinal hole with a longitudinal anode slot and a longitudinal cathode slot that are diametrically opposite each other, said central hole being aligned with said storage holes;
   anode and cathode contacts disposed within said anode and cathode slots, respectively, said anode contact being connected to an anode of said battery and said cathode contact being connected a cathode of said battery; and
   means, adapted for insertion through said holes, for charging said battery.

10. The hazard marker of claim 9 wherein said means for charging includes;
    a non conductive stick that carries a pair of metal strips, one strip on each of two opposite sides of said stick;
    a base connected to one end of said stick; and
    means for applying a charging voltage to said metal strips.

11. The hazard marker of claim 1 wherein said means includes a non-rechargeable battery.

12. The hazard marker of claim 3 wherein said means for causing comprises:
    an oscillator;
    a ring counter having a clock input connected to said oscillator at an output thereof, a plurality of outputs of said ring counter each providing a voltage having an amplitude directly related to a voltage applied to an excitation input of said ring counter;
    means for generating currents directly related to voltages provided at said ring counter outputs, said generated currents being respectively provided through said plurality of LEDs;
    a sampling resistor that provides a return path for current that passes through said LEDs;
    a reference voltage source; and
    an operational amplifier that has inverting and non inverting inputs connected to said sampling resistor and said reference voltage source, respectively, and an output connected to said excitation input of said ring counter.

13. The hazard marker of claim 12 wherein each of said means for generating comprises an NPN transistor with its base connected to an output of said ring counter, its emitter connected to an anode of one of said LEDs and its collector connected to a source of excitation.

14. The hazard marker claim 13 wherein said collector is connected to said source of excitation through one of said LEDs having its cathode connected to said collector.

* * * * *